United States Patent
Mills

(10) Patent No.: US 6,449,285 B1
(45) Date of Patent: Sep. 10, 2002

(54) DEVICE FOR MATCHING DISSIMILAR TELECOMMUNICATIONS PROTOCOLS

(75) Inventor: William Mills, Montgomery Village, MD (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/449,672

(22) Filed: Nov. 30, 1999

Related U.S. Application Data

(63) Continuation-in-part of application No. 09/430,187, filed on Oct. 29, 1999.

(51) Int. Cl.[7] .................................................. H04J 3/16
(52) U.S. Cl. ...................................... 370/466; 370/465
(58) Field of Search ................................ 370/465, 466, 370/467, 401, 389, 399, 252, 254, 402, 403, 351, 352, 522, 524; 375/222

(56) References Cited

U.S. PATENT DOCUMENTS

| | | | | |
|---|---|---|---|---|
| 4,680,781 A | * | 7/1987 | Amundson et al. | 375/222 X |
| 5,790,802 A | | 8/1998 | Van Loon et al. | 395/200.61 |
| 6,111,893 A | * | 8/2000 | Volftsun et al. | 370/466 |

* cited by examiner

Primary Examiner—Dang Ton
(74) Attorney, Agent, or Firm—Dana L. Burton; W. James Brady; Frederick J. Telecky, Jr.

(57) ABSTRACT

A system and method for interworking a net communication beginning with a proxy protocol and allowing retention of the fullest feature set for enhanced communications between devices. The system within a communications network, receives and analysis the protocol capabilities received by components attempting to establish a communications link and establishes a new proxy protocol based upon commonality of features.

13 Claims, 12 Drawing Sheets

DEVICE FOR MATCHING DISSIMILAR TELECOMMUNICATIONS PROTOCOLS

CROSS-REFERENCE TO RELATED APPLICATION

This application is a continuation-in-part of U.S. application Ser. No. 09/430,187, filed Oct. 29, 1999.

BACKGROUND OF THE INVENTION

The present invention relates to apparatus and methods for matching protocols in a communication system. More specifically, the invention relates to apparatus and methods for managing a plurality of different communications protocols in a single network to facilitate communication between different communication equipment.

Packet switched networks are increasingly more commonly used to establish voice connections and data communications. Once a connection over a packet network is established, signals are sent over the network in packets which can conform to established communication packet protocols, including CAS, SIP, H323, TSMU, ISDN and the like. Some communication equipment utilizes proprietary protocols such as QSMU, TSMU or E&M. To transmit voice over a packet network, the voice signal may be compressed and placed into data packets. These packets are transmitted over a packet network, received at the other end, decompressed and passed on as voice information.

There exists a wide variety of equipment which can be used for communications over a network. Networks, and Voice over IP, can be configured in an increasing varied manner and often include differing equipment at the originating and receiving ends of a communication link, as well as at the intermediate switches or nodes. In a telecommunications link, at least one switch will exist between each end of a connection link. It is common for a number of switches or nodes to be present between the originating and receiving ends of a communication link. Because many different types of switches and many varying protocols are available for use in a communications network, it is common for the originating, receiving and switching equipment to be configured for different communication protocols.

Prior to the present invention, each piece of equipment involved in a communications link had to communicate utilizing a protocol or one of a group of compatible protocols which support the least common denominator of features used in the link. In some circumstances communications would be established under less than optimal conditions to avoid protocol feature incompatibility.

SUMMARY OF THE INVENTION

The present invention provides a mechanism for interworking between different protocols. It also provides a mechanism to exchange and negotiate the capabilities of each protocol in a communications link. The protocol switching unit (PSU) of the present invention allows negotiation of extensions to the capabilities, including extensions to the base protocol. This helps achieve a highest set of capabilities supported by each protocol involved in the cell. The protocol switching unit facilitates negotiation of protocols between equipment on either side of the PSU. In order to facilitate negotiation, the PSU provides a common format protocol which is a negotiation framework, as a facility and can indicate a timing sequence.

A communication component interworking facility, of the present invention includes a protocol switching unit, required communication parameters, desired communication parameters and capable communication parameters corresponding to a first communication equipment device and desired communication parameters and capable communication parameters corresponding to a second communication equipment device, and a communication protocol established from convergence of said communication parameters.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
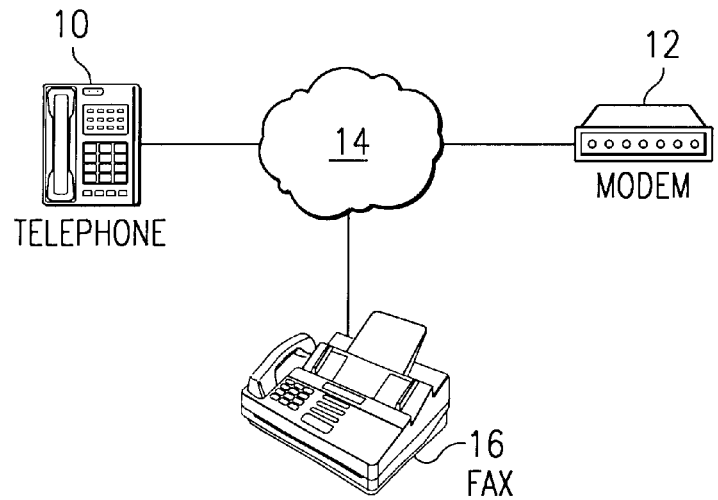
FIG. 1 is a block diagram illustrating a communications network which includes components enabled for a variety of communication protocols.

As illustrated in FIG. 1, a telecommunication network can include a number of different components, some with a common protocol and many with differing non-compatible protocols. Establishing a connection across such a network has heretofore relied upon a minimum capability set of features. All components are set to use this capability set regardless of the specific efficiencies of the individual components.

For example, a first telecommunication terminating component may be a telephone 10 with only CAS protocol capabilities enabled. A second terminating component may be a voice modem 12 with CAS and TSMU capabilities. The switch 14 may be capable of CAS and ISDN protocol passing. In order to establish a link between component 10 and 12, it was previously necessary to negotiate a common minimum set of capabilities during setup of the communication connection. This would require communication of protocol capabilities and selection of a common standard protocol. In the example, some functionality and loss of capabilities will occur in selection of a common minimum set of features. Although each of the components may be able to run greater feature sets, each component is limited to the aggregate of the features recognized by the common standard protocol.

In some instances, such as attempting to establish a connection between component 16 and component 12, a connection may not be possible. Component 16 only supports H323 protocol, which is not supported by either switch 14 or component 12.

Figure 2:
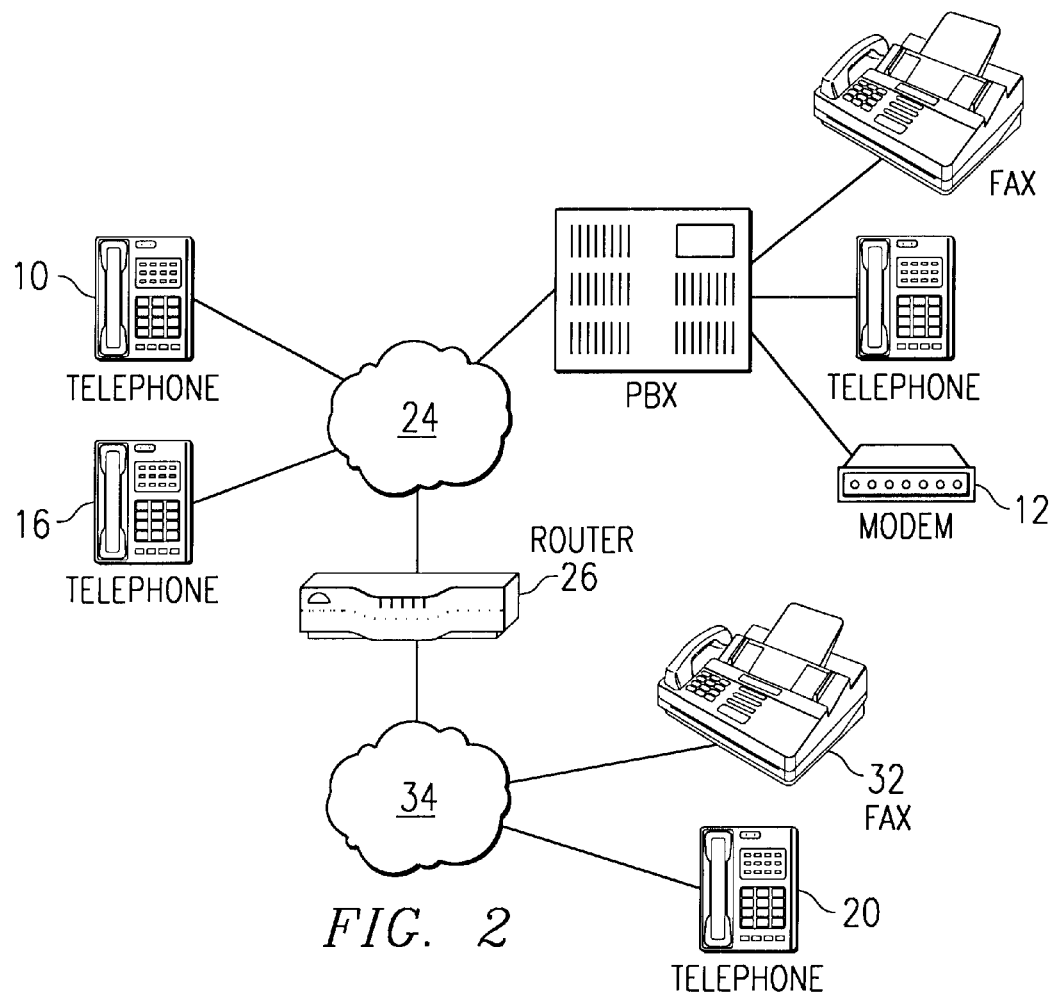
FIG. 2 is a block diagram illustrating an exemplary communications network which includes components enabled for a variety of communication protocols and includes a protocol switching unit of the present invention at a cell within the communications link.
Figure 3:
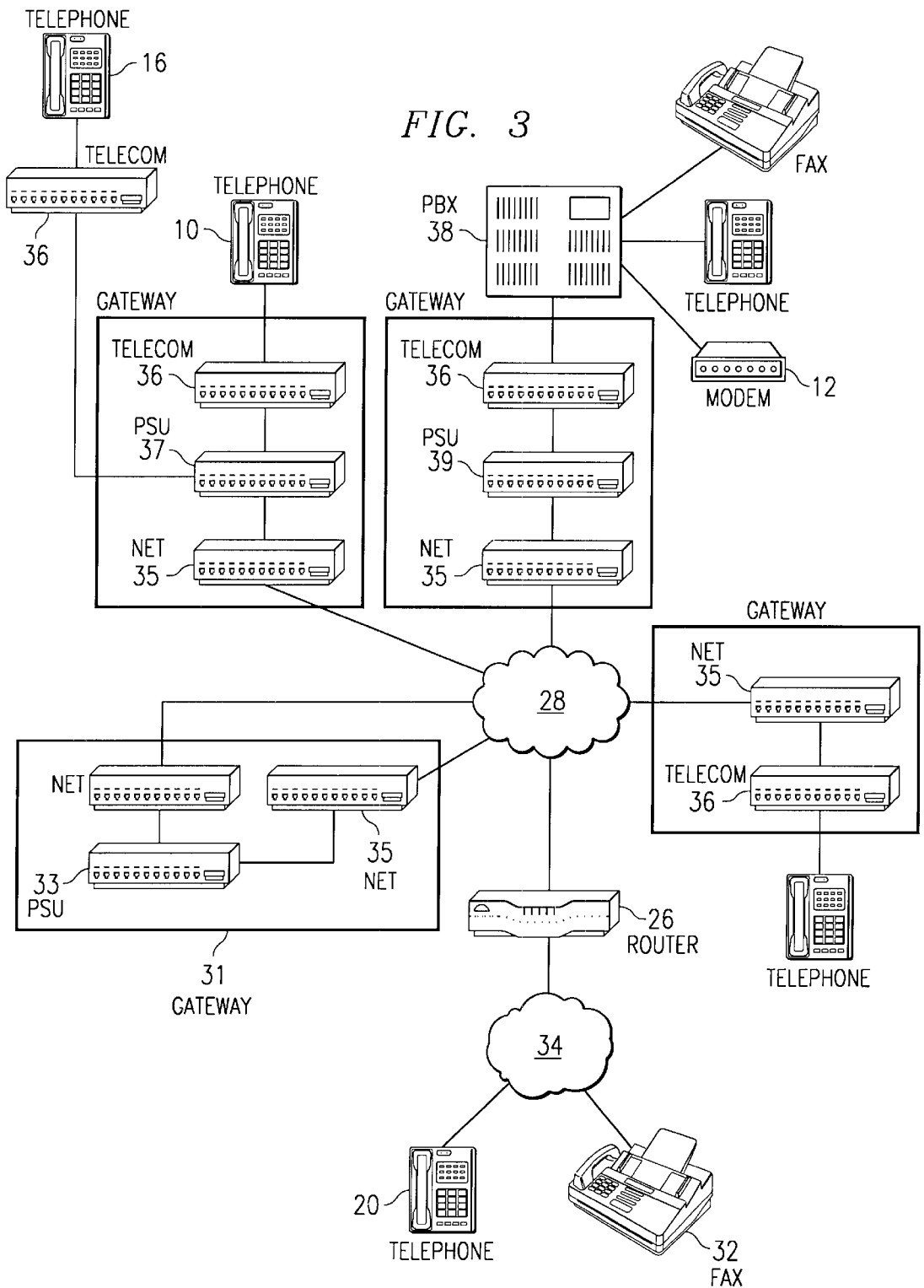
FIG. 3 is a block diagram illustrating an exemplary communications network including a number of gateways incorporating exemplary embodiments of the present invention.

With the present invention, as illustrated in FIGS. 2 and 3, a connection between components which do not support a common standard protocol can more often be established. FIG. 2 illustrates the embeding of a protocol switching unit PSU within the network 24, such as illustrated as gateway 31 of FIG. 3. Gateway 31 includes a PSU 33 and two network connectors 35.

The(PSU) specifies a proxy protocol for use in establishing a communication connection. The proxy protocol can include all of the enhanced features which are enabled on all of the components of the link. Alternatively, the protocol can include a portion of the common feature set. When a proxy protocol is established, components which do not share a common standard protocol can be connected and a larger feature set can be preserved between the components.

In the embodiment of the present invention as illustrated in FIG. 2, the PSU in the network 24 allows the negotiation of an adaptable protocol, to enable components on each side of the communications network to operate with the PSU. Because the PSU connects to each side, the components on opposite sides can communicate with each other. Each protocol stage provides interworking to the protocol established by the PSU, limiting the amount of interworking to be provided by each protocol stage. The PSU provides a common format protocol and a negotiation framework for interworking. The protocol format provided facilitates interworking and an indication of timing sequence.

Communication links may include multiple networks, such as networks 24 and 34 which can be IP, PSTN or other networks. The communication link can pass through additional components 26 between networks. For example, in order to establish a connection from component 32 to component 16 of FIG. 2, the link would have to include components 32, 34, 26, 24 and 16.

According to the present invention, PSU's in networks 24 and 34 establish a connection from 32 to 16 through 26 because each component need only know the PSU protocol to establish a connection.

FIG. 3 illustrates a number of exemplary gateway embodiments for implementing a PSU according to the teachings of the present invention. Although the PSU's in FIG. 3 are illustrated as separate units or boxes within a gateway, and although they can be implemented as such, a PSU can also be implemented as code within the hardware, software or DSP of a gateway device. The PSU's 37 and 39 can be connected between the network 28 and the telecommunications equipment. The PSU 33 can be connected at both ends to the network 28. A telecommunication connection device 36 can provide operative connection to the telecommunications equipment. A network connector 35 can provide operative connection of the PSU to the network 28.

PSU 37 provides interworking for telecommunication terminal equipment 10 and 16. PSU 39 provided interworking for local PBX equipment 38. PSU 33 can provide interworking for equipment not connected through a PSU or other equipment needing interworking.

Figure 4:
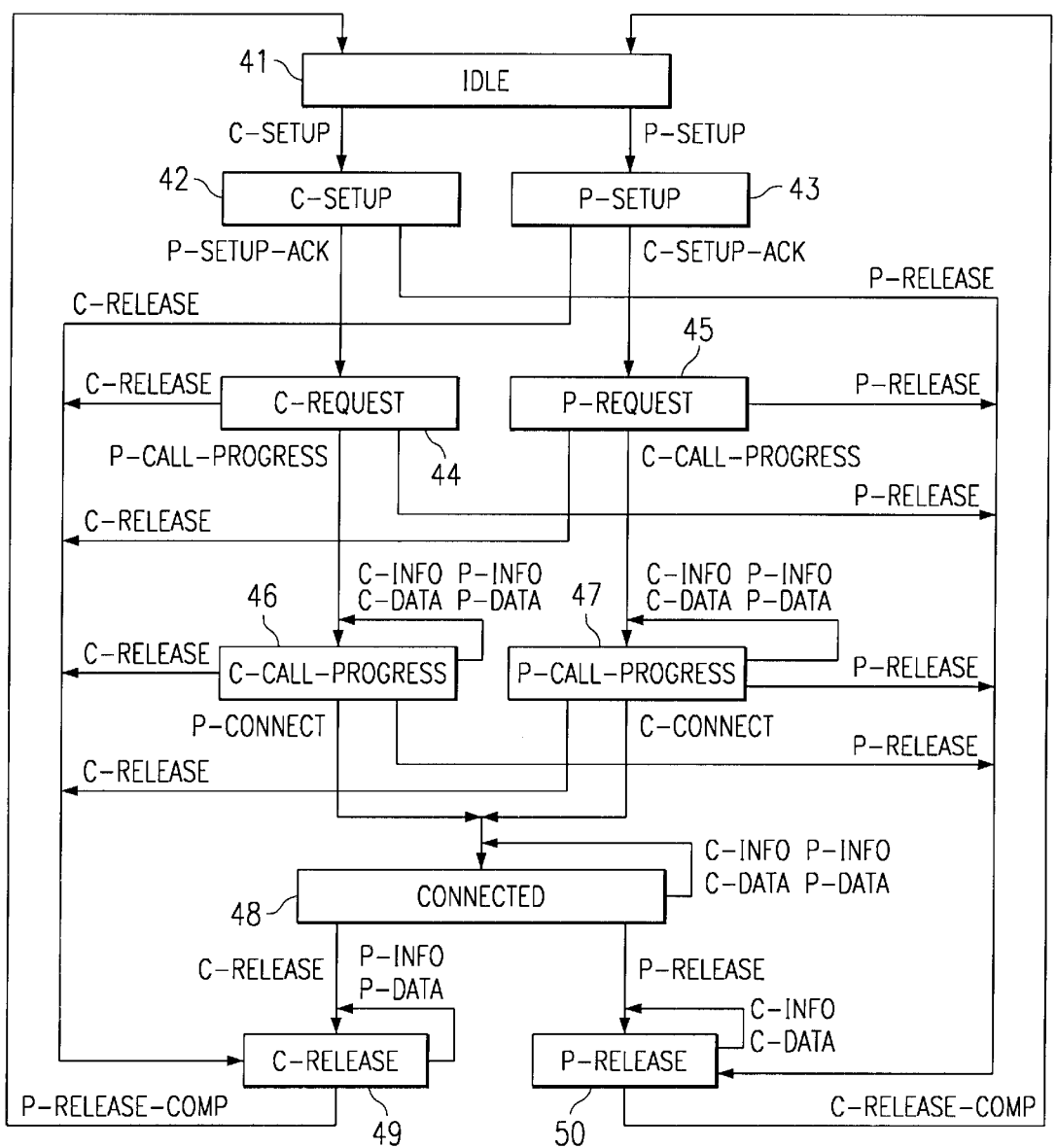
FIG. 4 is an exemplary logic flow diagram illustrating an exemplary PSU/Client Interaction Model utilized to establish communication using the proxy protocol encoding of the present invention.

In order to interwork a protocol, each component needs to provide an indication of its capabilities through the PSU. In an embodiment of the present invention the data packets from the components include capabilities exchange coding. This coding designates the required, preferred and capable features of the components for interworking. FIG. 4 illustrates the timing steps for establishment of a proxy protocol connection. During Setup, 46, the originating equipment sends its capabilities exchange coding. The receiving equipment knows the capabilities supported and not supported by it. The features can be separated into required, preferred and capable features. The required features are those needed to establish a connection. Preferred feature coding provides an indication of the optimal features for the protocol preferred by the equipment. Capable features provides an indication to other equipment of the sending equipment's capabilities for interworking.

As illustrated in FIGS. 5–13, once Setup and Net Connect have been exchanged, voice connection may be established, if the proxy protocol will support voice before establishment of the data path. Dial Complete and Teleconnect follow Net Connect in order to establish a call completion status. The packets are exchanged in the proxy protocol. These steps are repeated for each PSU link in the connection establishing an end-to-end connection until Release and Release Response are exchanged at the end of the connection.

Each call which is to be placed through a PSU has a call profile which can include coding profile, call capability and call identification parameters.

A coding profile is a collection of attributes to be used for a particular coding to be used for a call. Coding profiles are defined by the network management. Coding profiles can include the ITU identification, voice information field size, VAD and playout information, echo cancellation parameters, silence detection and the like. The usage field is a collection of bits that defines how the coding profile should be used. The user enables the desired usage bits to communicate the intent of the coding profile. For example, a coding using the fax relay coding should be appropriate for fax usage and can not be used for voice or modem. Likewise a coding profile using G723 could be used for voice but not for fax or modem. It can be common to configure two coding profiles with PCM. A first would have the echo canceler enabled and specify voice usage, the other would have the echo canceler disabled and specify fax and data usage.

A call capability is an indication of the features supported by that call. Each call capability bit set indicates a supported capability. Exemplary call capabilities include:

Support for passing Call progress tones in band (i.e. Call progress tones are carried as voice). Specifically as far as the PSU is concerned, the call is capable of carrying Call progress tones as Voice data after net-connect and before tele-connect state.

Support for full call progress tones in signaling band. Call progress indications are sent as information type packets. The call progress tones include ring back, busy etc. The call capability may only support the ring back indication as a call in progress indicator in the signaling band.

Support for the capability of the call to switch from one codec to another In Band (in voice mode) by detecting changes in the payload type of the packets.

Support for coding switchover in the Signaling Band. In the PSU this is accomplished by using the Set-Coding API. This happens after the Net connect stage.

Support for network overlap dialing. The Net connect happens even if all of the digits have not been collected. The call moves to Call progress when the dialing is completed.

Support for a General User to User Information Element packet passing support. This means that the call is capable of transporting IE's from user to user. The system may also support the passing of IE specifically needed for QSIG support.

Call identification parameters include an identification of a data call, a voice call, hard coded fax call or a modem setup call.

The capabilities are further divided into required, preferences and capabilities. Requirements are those call profile features which are required or mandatory by the Source or Destination of the call. Preferences are preferred by the Source or Destination. Capabilities are all of those features allowed by either the Source or Destination. A Profile Block FIG. 3, provides all of the required, preferred or allowed call profiles.

FIG. 4 is a logical flow diagram illustrating the interaction between a PSU and clients facilitating a negotiation through the PSU. The states shown are for the purpose of illustration only. The interaction model states define which functions are legal at which times and also define how each legal function is handled. Neither the PSU nor the client are required to have states that directly correspond to the interaction model states. The PSU implementation will guarantee that it generates only valid PSU-to-client functions and will guarantee that it can handle each legal client to PSU function. The client will also guarantee that it will only generate legal client-to-PSU functions and will handle each valid PSU-to-client function.

A series of states for the PSU are illustrated in FIG. 4. In the IDLE state 41 the PSU and the client wait for a setup request. If the PSU gets a setup request (c-setup) from the client, it moves to the C-Setup state 42. Similarly, if the client receives a setup request (p-setup) from the PSU, it should move to P-Setup state 43. All other messages are invalid in this state.

In the C-Setup state, the PSU sends a p-setup-ack if it can accept the setup request and moves to the c-request state 44. The PSU will send a p-release if it cannot accept the call which will release the call 50. All other messages are invalid in this state.

In the c-request state 44, the PSU can either send a p-call-progress and move to the c-call-progress state 46 or send a p-release and release the call 50. If the PSU gets a c-release from the client in this state it moves to the c-release state 49. All other messages are invalid in this state.

In the c-call-progress state 46 the PSU can send a p-connect message and move on to the connected state 48. It can send a p-release to the client if it cannot proceed with the call. Alternatively, the PSU can get a c-release from the client and move to c-release state 49. In addition c-info, c-data, p-info and p-data are valid messages in this state but will not result in a state change. All other messages are invalid in this state.

In the p-setup state 43, the client sends a c-setup-ack if it can accept the setup request and moves to the p-request state 45. The client will send a c-release if it cannot accept the call and the PSU will move to the c-release state 49. All other messages are invalid in this state.

In the p-request state 45 the Client can either send a c-call-progress and move on to the p-call-progress state 47 or send a c-release and release the call 49. If the client gets a p-release from the PSU in this state it moves to the p-release state 50. All other messages are invalid in this state.

In the p-call-progress state 47 the client can send a c-connect message and move on to the connected state 48. the client can send a c-release to the PSU if it cannot proceed with the call. The PSU can get a p-release from the client and move to p-release state. In addition, c-info, c-data, p-info and p-data are valid messages in this state but will not result in a state change. All other messages are invalid in this state.

In the connected state 48 data and information are passed and c-info, p-info, c-data and p-data are valid messages. In the connected state, the PSU can send a release to make the client move to the p-release state. Similarly, a client can send a c-release and make the PSU move to c-release state. All other messages are invalid in this state.

In the c-release state 49, the PSU can send p-release-comp messages and move back to the idle state 41. The PSU may still send p-info and p-data messages in this state. All other messages are invalid in this state.

In the p-release state 50, the client can send c-release-comp messages and move back to the idle state. The client may still send p-info and p-data messages in this state. ALL other messages are invalid in this state.

Figure 5:
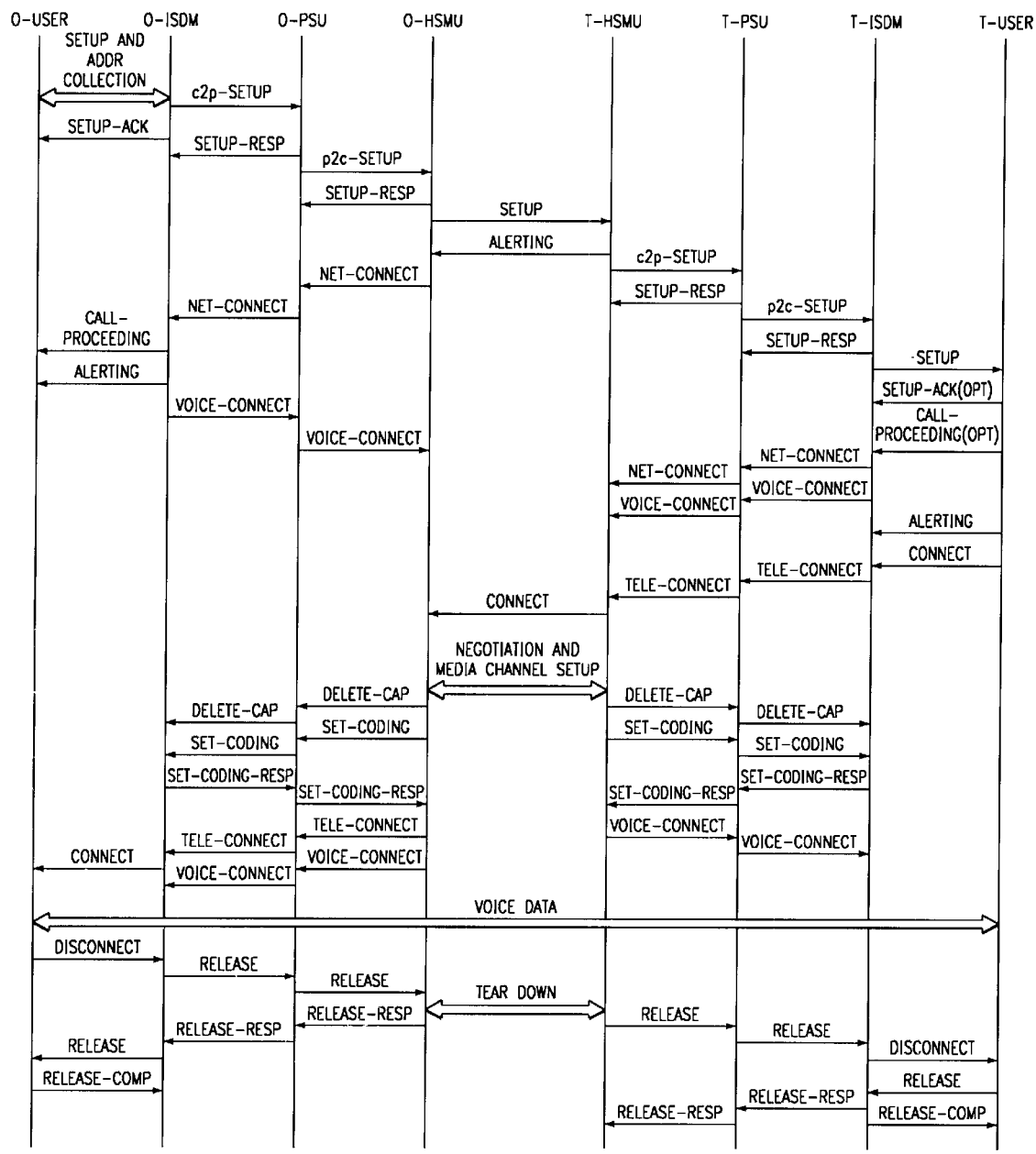
FIGS. 5–13 are exemplary call ladder negotiation and timing diagrams illustrating exemplary call processes of the present invention.
Figure 6:
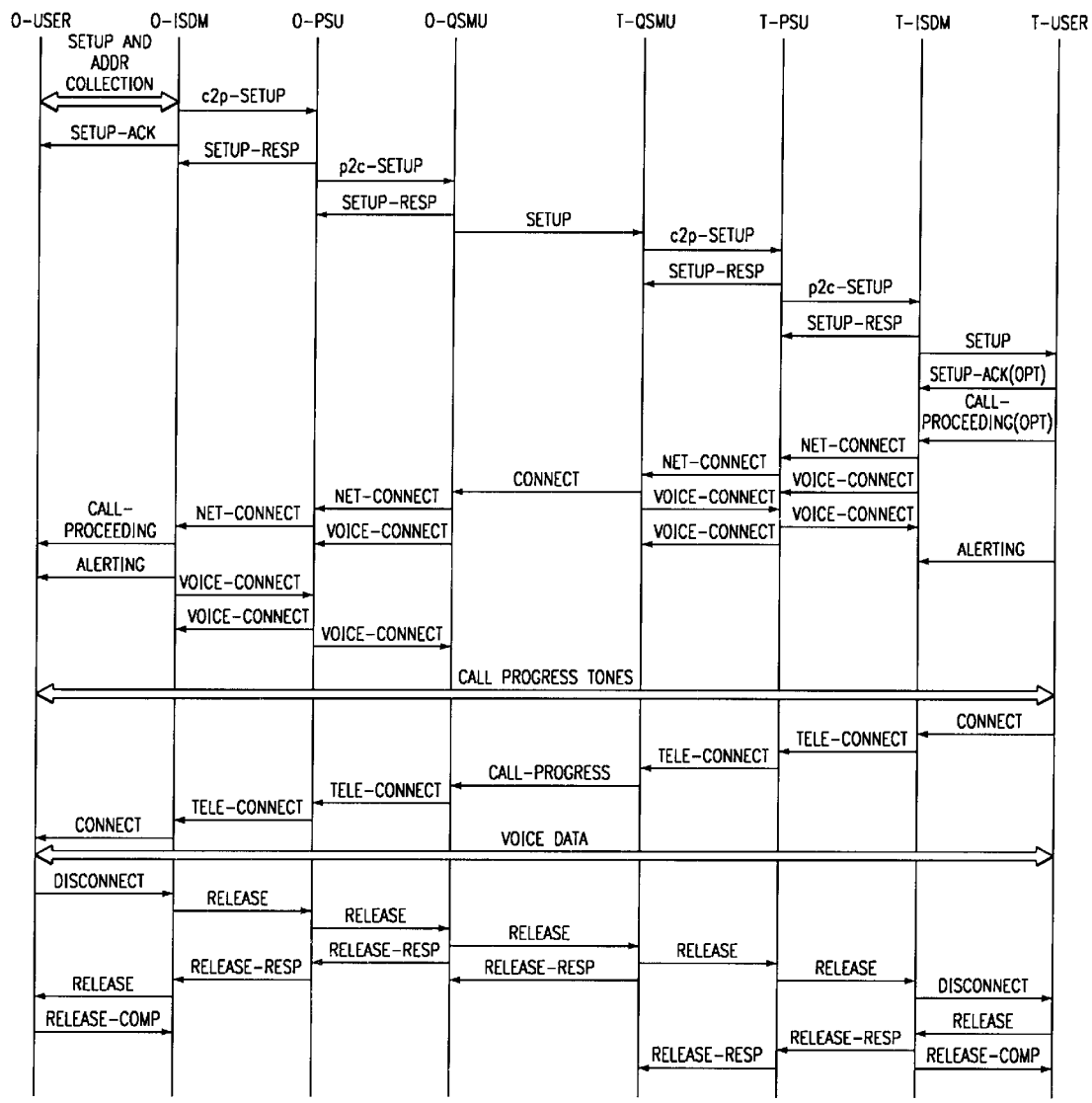
Figure 7A:
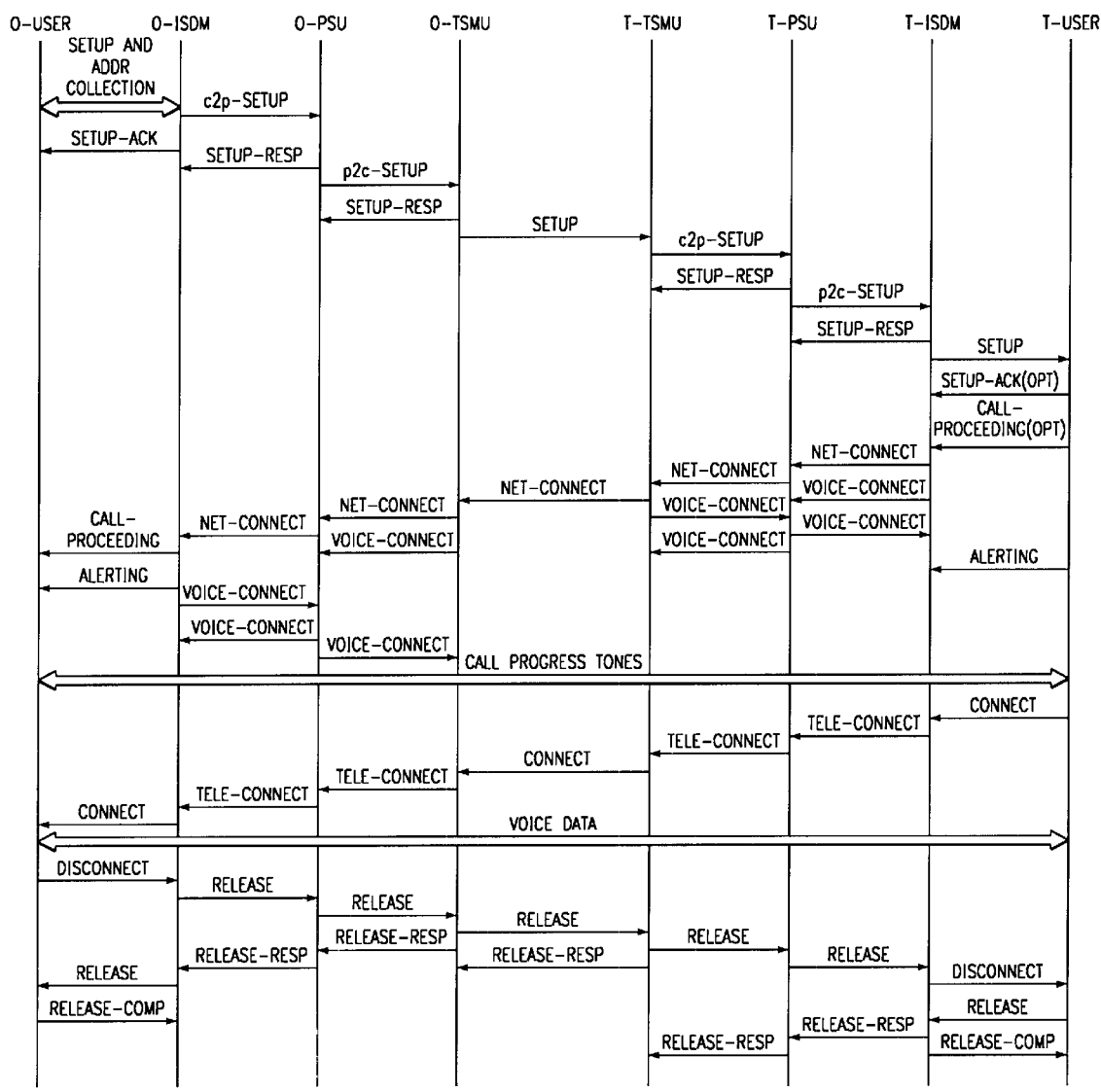
Figure 8:
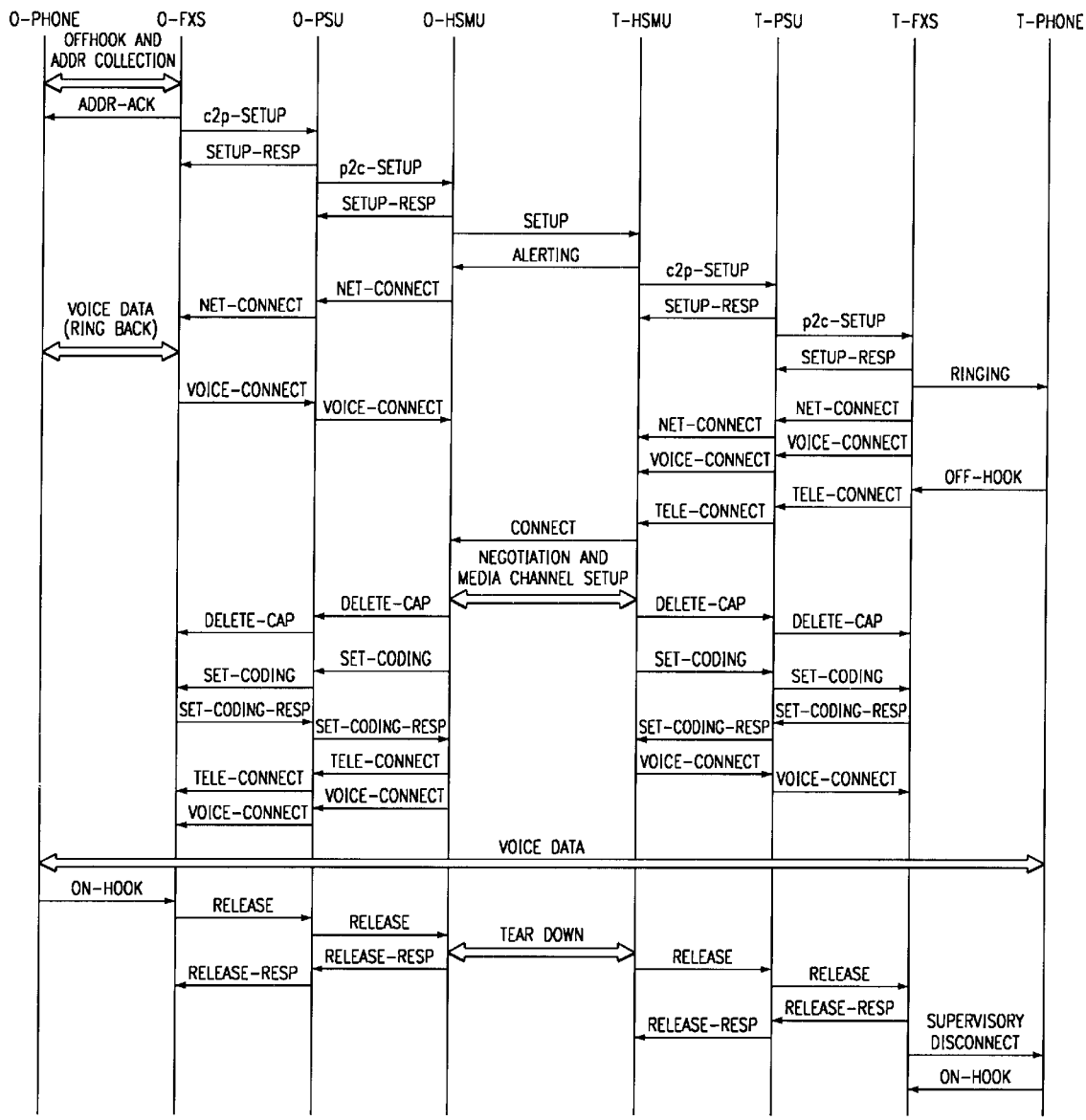
Figure 9:
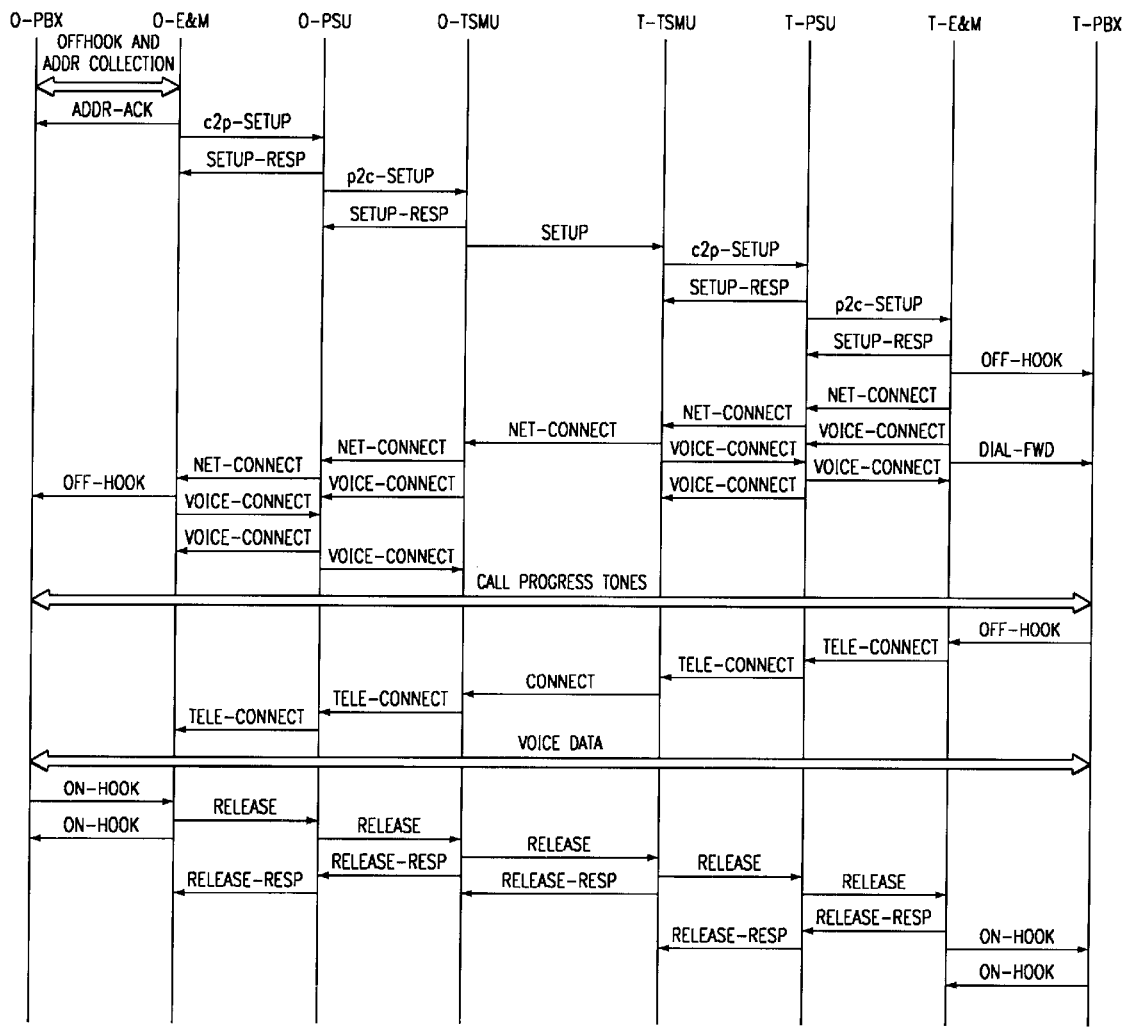
Figure 10:
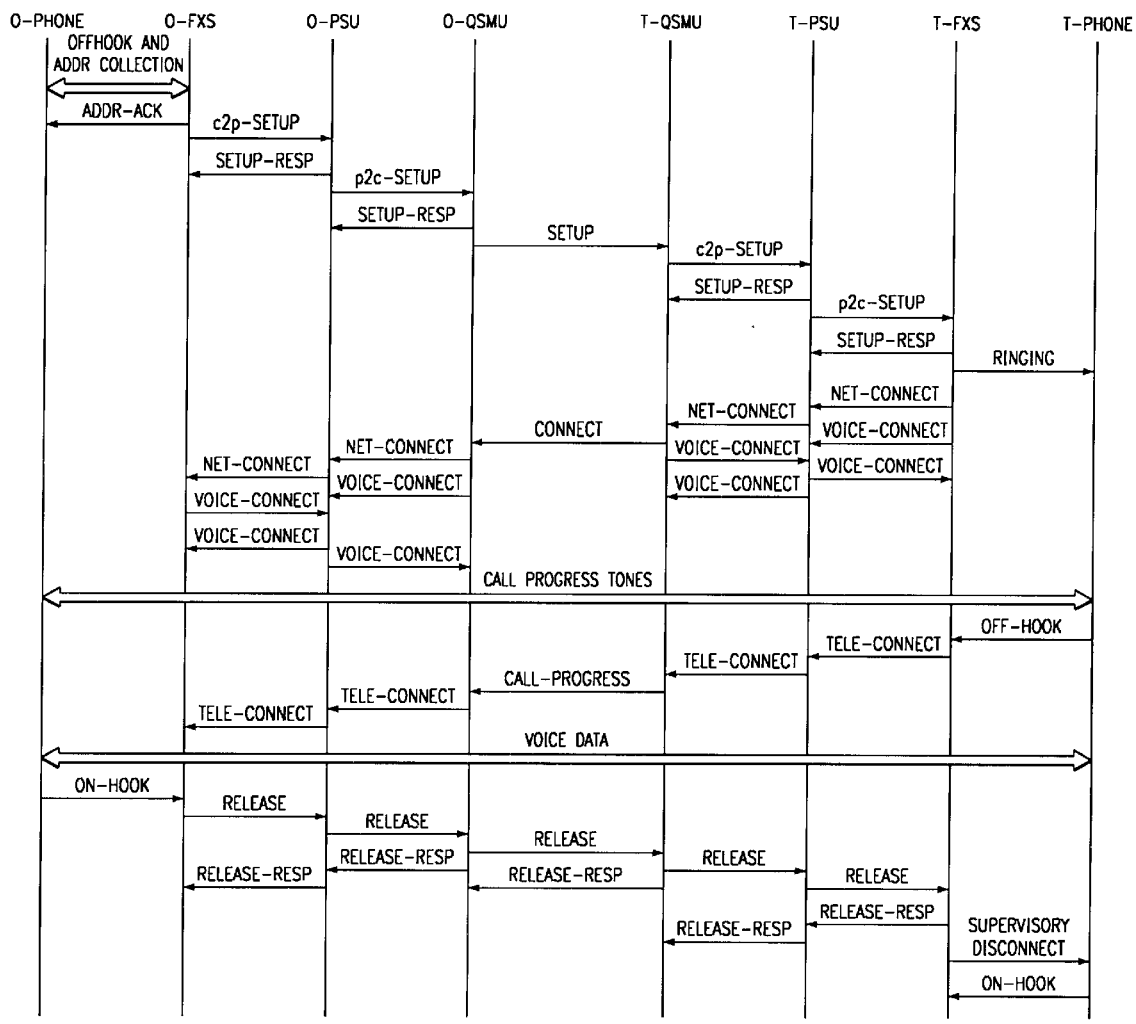
Figure 11:
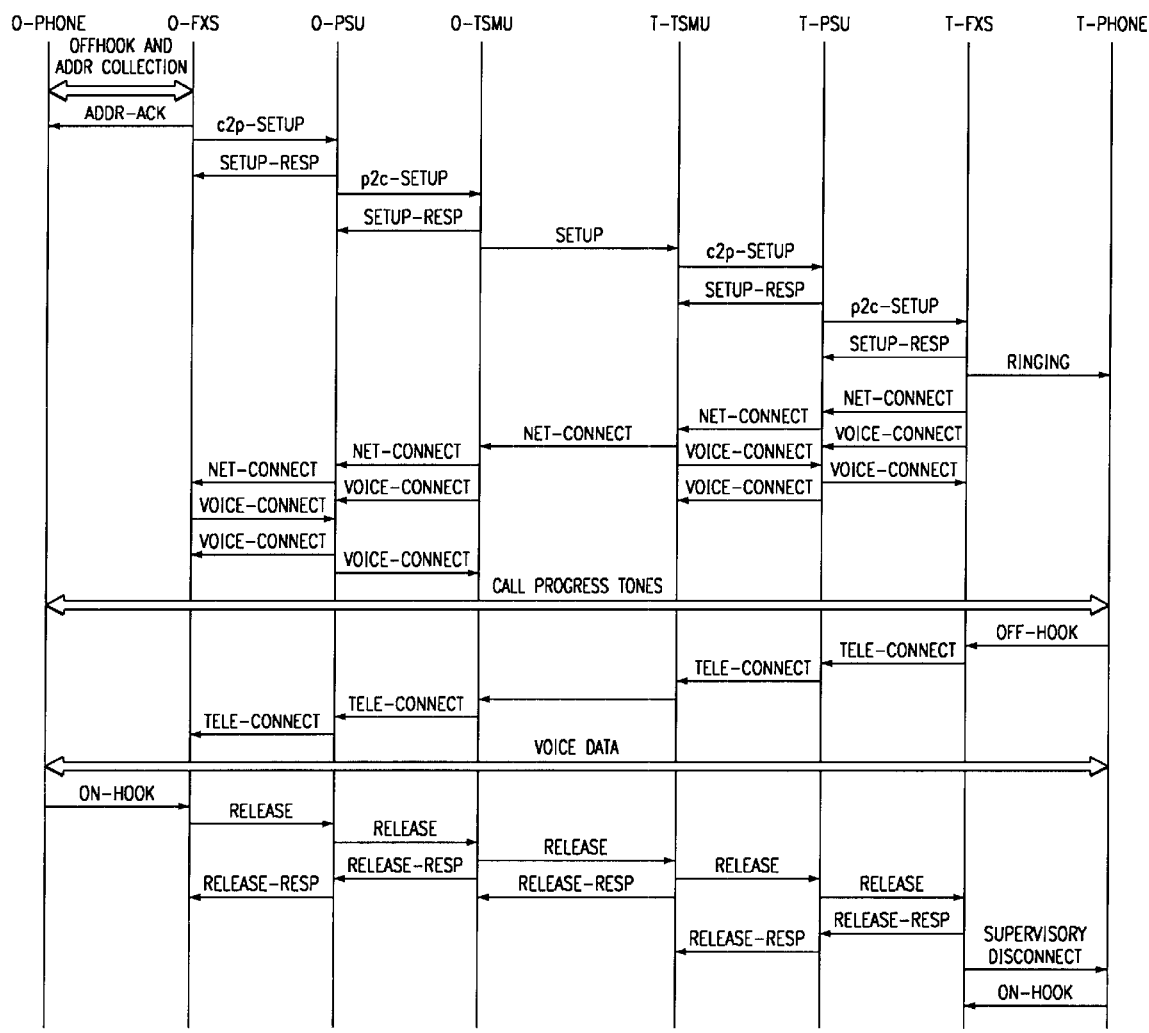
Figure 12:
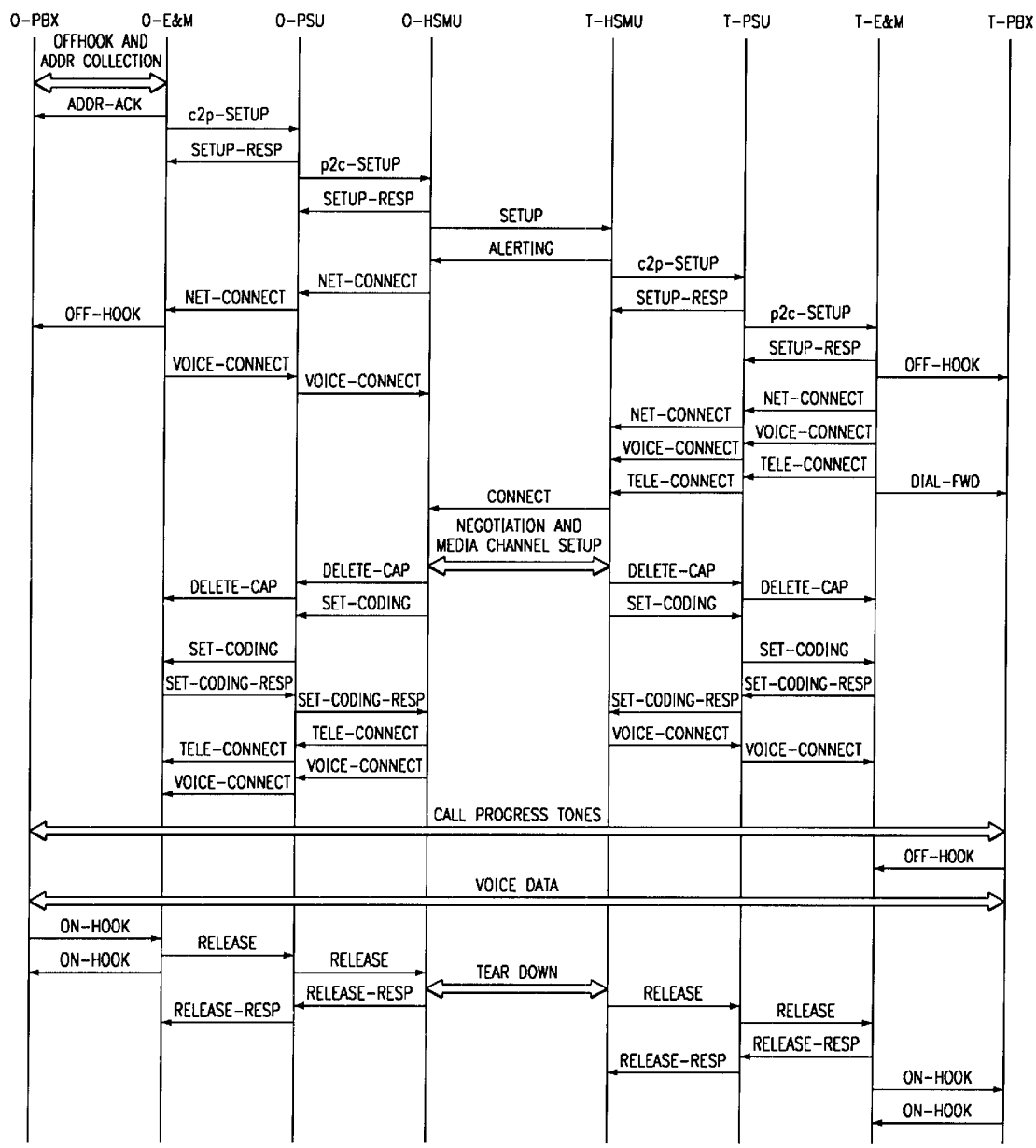
Figure 13:
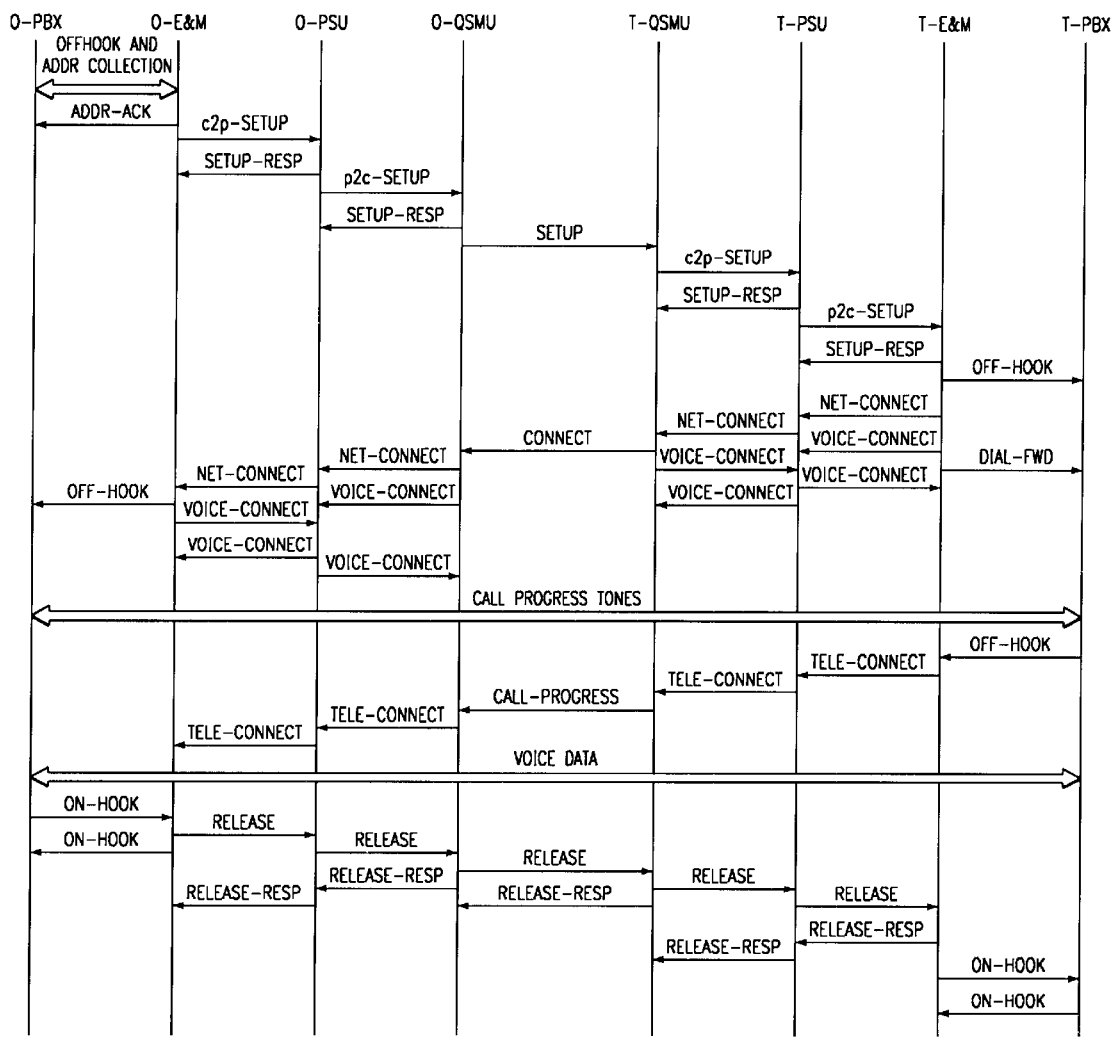

FIGS. 5 through 13 are call ladder diagrams illustrating some exemplary connection setups according to the teachings of the present invention. FIG. 5 illustrates the PSU interaction with the originating (O) switched mode client (SMC) and the terminating (T) SMC utilizing ISDN in the call process for establishing a call between the originating O-USER and the terminating T-USER. FIGS. 6 through 13 illustrate exemplary call processes for the users and protocols illustrated.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A method for facilitating a communications connection between two communication components having different non-compatible communication protocols, comprising:

providing a protocol switching unit for facilitating negotiation of a protocol between said communication components, wherein:

said protocol switching unit initially passes communications between said communications components according to a proxy protocol;

said communication components exchange information about their respective communication parameter capabilities and directly negotiate communication parameter settings;

said protocol switching unit identifies those parameters which can be matched in said proxy protocol and transfers said communications according to said parameters utilizing said proxy protocol, and said protocol switching unit has the capacity to pass communication information as direct packets between said communication components.

2. The method of claim 1, wherein said protocol switching unit facilitates the interworking of a final communication protocol between said first and second communication components and establishes a direct packet exchange of information for which the protocol switching units cannot establish a proxy protocol.

3. The method of claim 1, further including:

passing communications between said communication components for establishing, transferring and dropping said communication link and associated communicated information.

4. A communication component interworking facility for interconnecting at least two communication components wherein said communication components are incapable of operation on a common standard communication protocol, comprising:

a protocol switching unit, a first set of required communication parameters, a second set of desired communication parameters corresponding to a first communication component, a third set of capable communication parameters corresponding to said first communication equipment, a fourth set of desired communication parameters corresponding to a second communication component, a fifth set of capable communication parameters corresponding to said second communication equipment, wherein said second and said fourth communications parameters are incompatible;

a convergence communication protocol established by said two communication components from convergence of said first, second, third, fourth and fifth sets of communication parameters, previously unavailable to at least one of said communication components and a direct communication connection established by said protocol switching unit for passing communication parameters outside said convergence communication protocol.

5. The facility of claim 4, wherein said protocol switching unit initially passes communications according to a proxy protocol.

6. The facility of claim 5, wherein said protocol switching unit defines said first set of required communication parameters necessary for intercommunication between said communication components.

7. The facility of claim 6, wherein a first one of said communication components defines said second set of desired communication parameters corresponding to said first communication component.

8. The facility of claim 7, wherein said first communication component has a predetermined call feature capability and said first communication component defines said third set of capable communication parameters indicating the feature capability of said first communication component.

9. The facility of claim 8, wherein a second one of said communication components defines said fourth set of desired communication parameters corresponding to said second communication component.

10. The facility of claim 9, wherein said second communication component has a predetermined call feature capability and said second communication component defines said fifth set of capable communication parameters indicating the feature capability of said second communication component.

11. The facility of claim 10, wherein said protocol switching unit facilitates the interworking of a final communication protocol by and between said first and second communication components established from a convergence of said first, second, third, fourth and fifth sets of features.

12. The facility of claim 11, further including:

a communications connection for passing communications parameters between said first and second communication components for establishing, transferring and dropping said communications connection and associated communicated information.

13. The facility of claim 4, wherein said communication parameters passed outside said convergence communication protocol are information element packets.

* * * * *